US009192795B2

(12) United States Patent
Palacharla et al.

(10) Patent No.: US 9,192,795 B2
(45) Date of Patent: Nov. 24, 2015

(54) SYSTEM AND METHOD OF CALIBRATION IN A POWERED AIR PURIFYING RESPIRATOR

(75) Inventors: Praveen Kumar Palacharla, Hyderabad (IN); Madan Mohan Reddy Dumpala, Hyderabad (IN); Swapnil Gopal Patil, Bhiwandi (IN); Mehabube Rabbanee Shaik, Hyderabad (IN)

(73) Assignee: Honeywell International Inc., Morristown, NJ (US)

( * ) Notice: Subject to any disclaimer, the term of this patent is extended or adjusted under 35 U.S.C. 154(b) by 736 days.

(21) Appl. No.: 13/269,198

(22) Filed: Oct. 7, 2011

(65) Prior Publication Data

US 2013/0087150 A1 Apr. 11, 2013

(51) Int. Cl.
*F16K 31/02* (2006.01)
*A62B 18/00* (2006.01)

(52) U.S. Cl.
CPC ......... *A62B 18/006* (2013.01); *Y10T 29/49764* (2015.01)

(58) Field of Classification Search
USPC ............. 128/201.22, 201.25, 202.22, 204.18, 128/204.21, 204.23, 205.12
See application file for complete search history.

(56) References Cited

U.S. PATENT DOCUMENTS

| | | | |
|---|---|---|---|
| 3,773,044 | A | 11/1973 | Wallace |
| 3,965,892 | A | 6/1976 | Colston et al. |
| 4,046,492 | A | 9/1977 | Inglis |
| 4,088,461 | A | 5/1978 | Brauer |
| 4,109,509 | A | 8/1978 | Cramer et al. |
| 4,146,887 | A | 3/1979 | Magnante |
| 4,154,586 | A | 5/1979 | Jones et al. |
| 4,155,358 | A | 5/1979 | McAllister et al. |
| 4,195,780 | A | 4/1980 | Inglis |
| 4,326,514 | A | 4/1982 | Eian |
| 4,365,627 | A | 12/1982 | Wing |
| 4,385,728 | A | 5/1983 | Inglis et al. |
| 4,421,719 | A | 12/1983 | Burleigh |

(Continued)

FOREIGN PATENT DOCUMENTS

| | | | |
|---|---|---|---|
| DE | 102004013453 | A1 | 10/2005 |
| EP | 0042736 | A1 | 12/1981 |

(Continued)

OTHER PUBLICATIONS

American Discount Home Medical Equipment, http://www.home-med-equip.com/catalog/invacare-perfecto2-v-oxygenconcentrator-with-senso2-irc5po2v.html; information sheet, 2 pages; Nov. 9, 2011.

(Continued)

*Primary Examiner* — Kristen Matter
(74) *Attorney, Agent, or Firm* — Conley Rose, P.C.; Kristin Jordan Harkins

(57) ABSTRACT

A self-calibrating powered air purifying respirator (PAPR). The PAPR comprises an electric motor mechanically coupled to a blower; an air flow sensor, and a controller coupled to the air flow sensor and to the electric motor. The controller is configured to automatically execute a one-time self-calibration by driving the electric motor to a predefined operation point, receiving an indication from the air flow sensor, determining a reference parameter based on the indication from the air flow sensor, and storing the reference parameter, wherein after completion of the one-time self-calibration the controller controls the electric motor based on the stored reference parameter.

13 Claims, 5 Drawing Sheets

(56) References Cited

U.S. PATENT DOCUMENTS

| | | | | |
|---|---|---|---|---|
| 4,530,706 | A | 7/1985 | Jones | |
| 4,899,740 | A | 2/1990 | Napolitano | |
| 4,905,687 | A | 3/1990 | Ponkala | |
| 5,018,946 | A | 5/1991 | Breckner et al. | |
| 5,253,640 | A * | 10/1993 | Falb et al. | 128/200.24 |
| 5,255,412 | A | 10/1993 | Mally et al. | |
| 5,285,794 | A | 2/1994 | Lynch | |
| 5,297,544 | A | 3/1994 | May et al. | |
| 5,413,097 | A | 5/1995 | Birenheide et al. | |
| 5,512,882 | A | 4/1996 | Stetter et al. | |
| 5,577,496 | A | 11/1996 | Blackwood et al. | |
| 5,659,296 | A | 8/1997 | Debe et al. | |
| 5,671,730 | A | 9/1997 | Ollila | |
| 5,848,591 | A | 12/1998 | Weismann | |
| 5,950,621 | A | 9/1999 | Klockseth et al. | |
| 5,970,975 | A | 10/1999 | Estes et al. | |
| 6,186,140 | B1 | 2/2001 | Hoague | |
| 6,340,291 | B1 | 1/2002 | Reckert | |
| 6,375,725 | B1 | 4/2002 | Bernard et al. | |
| 6,401,714 | B1 | 6/2002 | Giorgini | |
| 6,452,510 | B1 | 9/2002 | Zysko | |
| 6,651,658 | B1 | 11/2003 | Hill et al. | |
| 6,666,209 | B2 | 12/2003 | Bennett et al. | |
| 6,701,864 | B2 | 3/2004 | Watson, Jr. et al. | |
| 6,814,073 | B2 | 11/2004 | Wickham | |
| 6,953,318 | B2 | 10/2005 | Krugerke | |
| 7,195,015 | B2 | 3/2007 | Kuriyama | |
| 7,236,818 | B2 * | 6/2007 | McLeod et al. | 600/509 |
| 7,296,573 | B2 | 11/2007 | Estes et al. | |
| 7,328,700 | B2 | 2/2008 | Baker et al. | |
| 7,380,551 | B2 | 6/2008 | Alvey | |
| 7,442,237 | B1 | 10/2008 | Gardner | |
| 7,503,962 | B2 | 3/2009 | Attar | |
| 7,798,017 | B2 * | 9/2010 | Betz | 73/861.65 |
| 7,897,109 | B2 | 3/2011 | Labuda | |
| 2002/0062830 | A1 | 5/2002 | Meier et al. | |
| 2002/0139370 | A1 | 10/2002 | Bachinski | |
| 2003/0019494 | A1 | 1/2003 | Bennett et al. | |
| 2003/0192536 | A1 | 10/2003 | Odell et al. | |
| 2004/0223876 | A1 | 11/2004 | Kirollos et al. | |
| 2005/0005935 | A1 | 1/2005 | Gradon | |
| 2005/0022817 | A1 | 2/2005 | Alvey | |
| 2005/0109341 | A1 | 5/2005 | Alvey | |
| 2005/0115561 | A1 | 6/2005 | Stahmann et al. | |
| 2005/0183721 | A1 | 8/2005 | Juergensen | |
| 2006/0213513 | A1 | 9/2006 | Seong | |
| 2007/0163588 | A1 | 7/2007 | Hebrank et al. | |
| 2007/0215159 | A1 | 9/2007 | Ross et al. | |
| 2007/0235030 | A1 | 10/2007 | Teetzel et al. | |
| 2008/0063575 | A1 | 3/2008 | Rakow et al. | |
| 2008/0092891 | A1 | 4/2008 | Cewers | |
| 2008/0216833 | A1 | 9/2008 | Pujol et al. | |
| 2009/0004047 | A1 | 1/2009 | Hunter et al. | |
| 2009/0027216 | A1 | 1/2009 | Huang et al. | |
| 2009/0266361 | A1 | 10/2009 | Bilger et al. | |
| 2011/0114093 | A1 | 5/2011 | Patil et al. | |
| 2011/0114094 | A1 | 5/2011 | Stone et al. | |
| 2011/0146682 | A1 | 6/2011 | Patil et al. | |
| 2011/0162647 | A1 * | 7/2011 | Huby et al. | 128/203.14 |
| 2012/0084053 | A1 | 4/2012 | Yuen et al. | |
| 2012/0138051 | A1 | 6/2012 | Curran et al. | |
| 2014/0190483 | A1 | 7/2014 | Hansen et al. | |

FOREIGN PATENT DOCUMENTS

| | | | |
|---|---|---|---|
| EP | 1417988 | A1 | 12/2004 |
| EP | 2070563 | A1 | 6/2009 |
| GB | 1597979 | | 12/1977 |
| GB | 1554542 | | 1/1978 |
| GB | 2180761 | A | 4/1987 |
| GB | 2209474 | A | 5/1989 |
| GB | 2287656 | A | 9/1995 |
| WO | 9612523 | | 5/1996 |
| WO | 2007128584 | | 11/1997 |
| WO | 9927352 | | 6/1999 |
| WO | 03028842 | A2 | 4/2003 |
| WO | 2003028842 | A2 | 4/2003 |
| WO | 2007128584 | | 11/2007 |
| WO | 2008006152 | A1 | 1/2008 |
| WO | 2009067583 | A2 | 5/2009 |

OTHER PUBLICATIONS

Toyotomi Air Purifier with Oxygen Concentrator Model ETK-S50DX www,toyotomiusa.com; information sheet; 1 page, date = pre-Oct. 7, 2011.

American Discount Home Medical Equipment, http://www.home-med-equip.com/catalog/invacare-perfecto2-v-oxygen-concentrator-with-senso2-irc5po2v.html; information sheet, 2 pages; Nov. 9, 2011.

Toyotomi Air Purifier with Oxygen Concentrator Model ETK-S50DX www,toyotomiusa.com; information sheet; 1 page date=pre-Oct. 7, 2011 /KCM/.

American Discount Home Medical Equipment, http://www.horne-med-equip.com/catalog/invacare-perfecto2-v-oxygenconcentrator-with-senso2-irc5po2v.html; information sheet, 2 pages; Nov. 9, 2011.

Toyotomi Air Purifier with Oxygen Concentrator Model ETK-S50DX www,toyotomiusa.com; information sheet; 1 page.

PCT/US2012/058508, PCT International Search Report, dated Dec. 18, 2013, 3 pages.

PCT/US2012/058508, PCT Written Opinion of the International Searching Authority, dated Dec. 18, 2013, 5 pages.

US Office Action for U.S. Appl. No. 13/269,198 dated May 27, 2015, 12 pages.

US Office Action for U.S. Appl. No. 13/346,340 dated Oct. 1, 2015, 13 pages.

* cited by examiner

SYSTEM AND METHOD OF CALIBRATION IN A POWERED AIR PURIFYING RESPIRATOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Powered air purifying respirators (PAPRs) utilize a mechanism, such as a blower, impeller, fan or other mechanism, to draw ambient air through air purifying elements to remove contaminants from the air. PAPRs are designed to be human portable for use in atmospheres with solid and liquid contaminants, gases, and/or vapors to provide a useable and safe supply of breathable air where the concentrations of contaminants are not immediately dangerous to life or health and the atmosphere contains adequate oxygen to support life. PAPRs carry a self-contained power source such as a battery to energize a motor to drive the blower, impeller, or fan. The self-contained power source desirably is sized small enough so the PAPR is readily human portable and large enough that the PAPR can be used without recharging the power source for a portion of a work shift effective to promote efficient worker operation.

SUMMARY

A self-calibrating powered air purifying respirator (PAPR) is disclosed. The PAPR comprises an electric motor mechanically coupled to a blower, an air flow sensor, and a controller coupled to the air flow sensor and to the electric motor. The controller is configured to automatically execute a one-time self-calibration by driving the electric motor to a predefined operation point, receiving an indication from the air flow sensor, determining a reference parameter based on the indication from the air flow sensor, and storing the reference parameter, wherein after completion of the one-time self-calibration the controller controls the electric motor based on the stored reference parameter.

A method of manufacturing a powered air purifying respirator is disclosed. The method comprises assembling a powered air purifying respirator, wherein the powered air purifying respirator comprises a blower, an electric motor coupled to the blower, an air flow sensor, and a controller coupled to the electric motor and to the air flow sensor. The method further comprises evaluating a calibration state of the powered air purifying respirator, the evaluation performed automatically by the controller and, when the calibration state is uncalibrated, driving the electric motor to a predefined operation point. The method further comprises comparing a sensor value output by the air flow sensor to an initial control reference value stored in a memory of the controller to determine a calibrated control reference value and storing the calibrated control reference value in the memory, wherein the controller is configured to control the electric motor based at least in part on the calibrated control reference value stored in the memory when the powered air purifying respirator is in a calibrated state.

A method of operating a powered air purifying respirator in the field is disclosed. The method comprises powering on the powered air purifying respirator and evaluating a calibration state of a powered air purifying respirator, wherein the powered air purifying respirator comprises a blower, an electric motor coupled to the blower, an air flow sensor, and a controller coupled to the electric motor and to the air flow sensor, the evaluation performed automatically by the controller. The method further comprises, when the calibration state is uncalibrated, driving the electric motor to a predefined operation point and comparing a sensor value output by the air flow sensor to an initial control reference value stored in a memory to determine a calibrated control reference value. The method further comprises storing the calibrated control reference value in the memory and, after storing the calibrated control reference value in the memory, changing the calibration state of the powered air purifying respirator to calibrated. The method further comprises, when the calibration state is calibrated, driving the electric motor by the controller based at least in part on the calibrated control reference value and based on the sensor value output by the air flow sensor.

These and other features will be more clearly understood from the following detailed description, taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Powered air purifying respirators (PAPRs) are well known in the art. An exemplary PAPR is described in US patent application publication US 2011/0146682 A1 entitled "Sensor Apparatus and Method to Regulate Air Flow in a Powered Air Purifying Respirator" by Swapnil Gopal Patil, et al, published Jun. 23, 2011, U.S. patent application Ser. No. 12/645,044 filed Dec. 22, 2009, which is hereby incorporated by reference in its entirely. A PAPR may comprise a motor mechanically coupled to an air blower. As the motor turns the air blower, the air blower draws air through one or more filters and delivers breathable air to a user, for example via a hose to a face mask worn by the user. The PAPR may comprise a battery that provides power to drive the motor and a controller that regulates the speed of the motor to provide a controlled air flow rate.

Ideally, all PAPRs of the same model and/or type would be manufactured so as to produce the design air flow objective based on a common control reference value, for example a set-point stored in a memory of the PAPR. In practice, however, due to variation among the components of the PAPR, relying on a common control reference value to control the PAPR does not produce equal air flows in different PAPRs. For example, unit-to-unit differences in electric motors, differences in air blowers, differences in switching mode power supplies (SMPSs), and differences in other components may contribute to producing different air flows when relying on a common control reference value. In one PAPR the common control reference value may produce an air flow that is less than the rate of air flow specified by a design, and the air flow may then fail to meet the applicable safety codes defining acceptable air flow rates. In another PAPR the common control reference value may produce an air flow that exceeds the rate of air flow specified by the design, and the battery of the subject PAPR may then discharge prematurely. The present disclosure teaches a PAPR that self-calibrates and establishes a calibrated control reference value for each individual PAPR that accommodates component variations within each PAPR, whereby the PAPR provides an air flow rate that meets the design specification without either deficient or excessive air flow.

Figure 1:
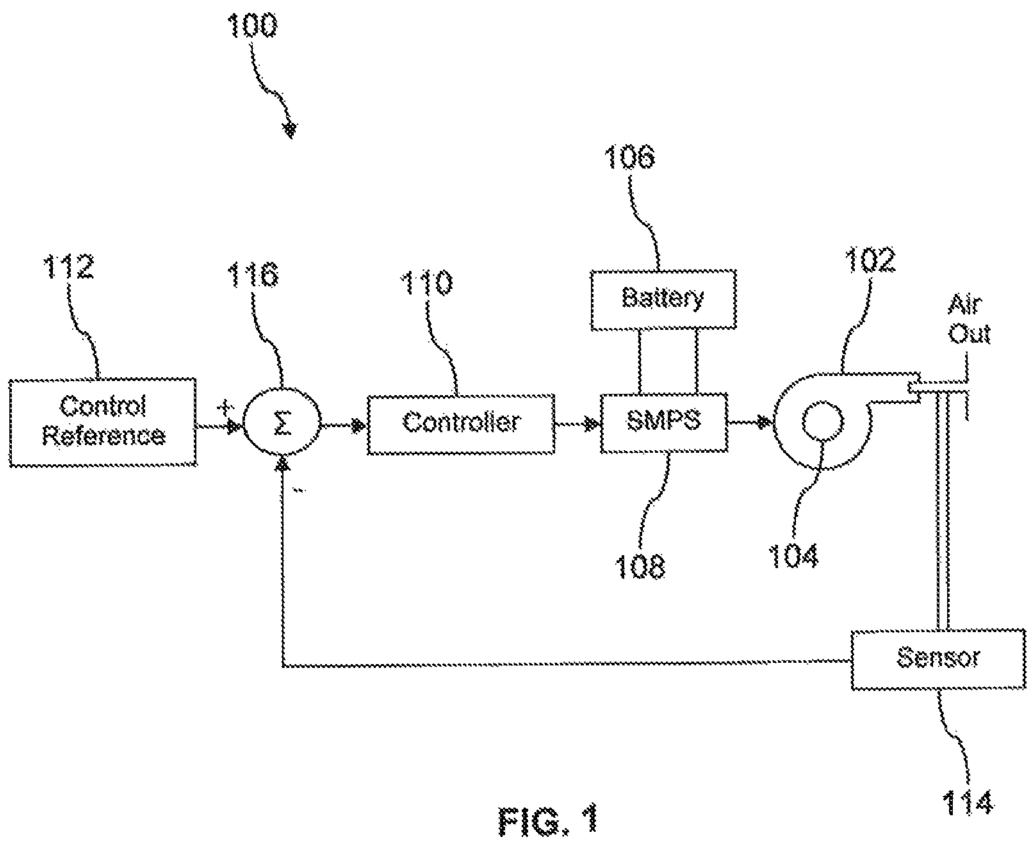
FIG. 1 is an illustration of a control system according to an embodiment of the disclosure.

Turning now to FIG. 1, a system 100 is described. In an embodiment, the system 100 comprises an air blower 102, an electric motor 104, a battery 106, a switched mode power supply (SMPS) 108, a controller 110, a control reference 112, a sensor 114, and a summation junction 116. It is understood that some components commonly present in PAPRs are not shown in FIG. 1 to avoid cluttering the illustration. For example, in an embodiment, the air outlet at the right hand side of the illustration may be coupled into an air hose attached to a face mask. In an embodiment, the system 100 may be varied in some ways, and some components may be combined. For example, in an embodiment, the control reference 112 may be integrated with the controller 110, for example the control reference 112 may be stored in a memory location of the controller 110. In an embodiment, the system. 100 may not employ the switched mode power supply 108 but instead some other form of electrical power modulation component that modulates electrical power delivered to the electric motor 104 under control of the controller 110.

In an embodiment, the system 100 may not employ the switched mode power supply 108, and the controller 110 may comprise the circuitry for electrical power modulation and may connect directly to the electric motor 104. In an embodiment, the output of the sensor 114 may be filtered before feeding into the summation junction 116. For example, the output of the sensor 114 may be low-pass filtered to remove noise from the sensor signal. In an embodiment, the controller 110 may be an electronic controller or processor. Alternatively, the controller 110 may be an algorithm or firmware that is executed by a processor.

The switched mode power supply 108 may deliver a pulsed width modulated electrical power output to the electric motor 104 that is characterized by a voltage amplitude and/or a pulse duration or width. By increasing the output pulse duration and/or pulse duty cycle of the switched mode power supply 108, the controller 110 indirectly commands the electric motor 104 to turn faster and hence to increase the rate of air flow delivered by the air blower 102. By decreasing the output pulse duration of the switched mode power supply 108, the controller 110 indirectly commands the electric motor 104 to turn slower and hence to decrease the rate of air flow delivered by the air blower 102.

The controller 110 commands the electric motor 104 based on the difference between the control reference value 112 and the output of the sensor 114 calculated or determined by the summation junction 116. The sensor 114 provides an indication of the air flow. In an embodiment, the sensor 114 comprises a first probe located in an airflow channel of the PAPR that measures a stagnation pressure in the airflow channel and a second probe located to measure a static pressure in the airflow channel. The sensor 114 compares the difference of pressures sensed by the first probe and the second probe to develop an indication of air flow rate. For further details of a differential pressure based air flow rate sensor, see U.S. patent application publication US 2011/0146682 A1 entitled "Sensor Apparatus and Method to Regulate Air How in a Powered Air Purifying Respirator" by Swapnil Gopal Patil, et al., identified and incorporated by reference above. In another embodiment, however, a different kind of sensor 114 may be used to provide an indication or air flow. As mentioned above, the output of the sensor 114 may be filtered to remove noise and to smooth the sensor output before processing by the summation junction 116.

As the value of the output of the sensor 114 drops below the control reference value 112, the output of the summation junction 116 becomes positive and increases in magnitude the further the value of the output of the sensor 114 drops. The positive output of the summation junction 116 received by the controller 110 causes the controller 110 to drive the electric motor 104 faster and hence increases the air flow rate. As the value of the output of the sensor 114 rises above the control reference value 112, the output of the summation junction 116 becomes negative and increases in magnitude the further the output of the sensor 114 increases. The negative output of the summation junction 116 received by the controller 110 causes the controller 110 to drive the electric motor 104 slower and hence decreases the air flow rate. The controller 110 may process the output of the summation junction 116 in various ways to provide for stability and smooth air flow. In steady state, the output of the summation junction 116 may be such that the air blower 102 maintains a substantially constant air flow rate.

In an embodiment, the system 100 may be operated in either a calibration mode of operation or a normal mode of operation. In the calibration mode of operation, the controller 110 may drive the electric motor 104 to a predefined operation point in an open loop control fashion. For example, the controller 110 may drive the electric motor 104 by outputting a predefined pulse width modulation voltage amplitude command and a predefined pulse width modulation duration command and/or duty cycle command to the switched mode power supply 108, and the switched mode power supply 108 may provide the commanded voltage amplitude and pulse duration or duty cycle electrical power output to the electric motor 104. After waiting an amount of time that is effective to allow the electric motor 104 to reach steady state, a comparison between the output of the sensor 114 and an initial control reference value 112 may be performed.

If there is a material difference between the output of the sensor 114 and the initial control reference value 112, then the system 100 is not calibrated and either the air flow rate is excessive and hence battery life is unnecessarily shortened or the air flow rate is deficient and hence insufficient air flow is delivered to a user of the PAPR. In either case, a calibrated control reference value 112 is calculated and written into a memory location storing the control reference 112. If there is no material difference between the output of the sensor 114 and the initial control reference value 112, the system 100 is already calibrated, and the memory location storing the control reference 112 is allowed to retain the initial control reference value 112. In an embodiment, a the difference may be compared to a predefined tolerance to determine if the system 100 is calibrated or not calibrated.

Figure 2:
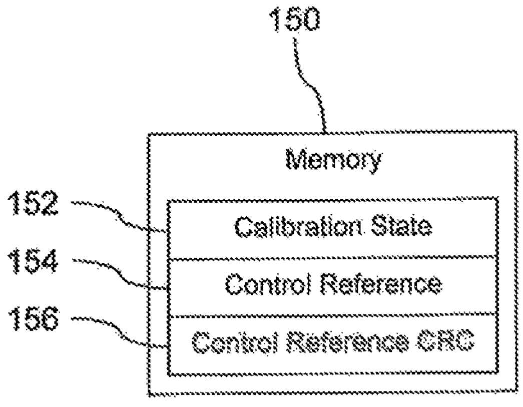
FIG. 2 is an illustration of a memory according to an embodiment of the disclosure.

Turning now to FIG. 2, a memory 150 is described. The memory 150 may be part of a memory chip that is coupled to the controller 110 or may be part of a memory integrated with a processor chip. In an embodiment, the memory 150 comprises a first memory location 152 storing a calibration state of the PAPR, a second memory location 154 storing a control reference value 154, and a third memory location 156 storing a control reference cyclic redundancy check (CRC) value. In alternative embodiment, the memory 150 may not comprise the third memory location 156 and may not store a control reference CRC value. In an embodiment, when the PAPR is first assembled and/or manufactured, the first memory location 152 may store an uncalibrated state value. The programming that implements the controller 110, for example instructions to be executed by a processor, may read the first memory location 152 after initial power-on of the system 100, and when the first memory location 152 stores the uncalibrated state value, the processor: may perform the calibration operation described above. After the calibration operation is completed, the processor may write a calibrated state value into the first memory location 152. Thereafter when the system 100 is powered on, the processor reads the first memory location 152, determines that the system 100 is in the calibrated state, and implements closed loop control of the air flow based on the value stored in the second memory location 152. It is understood that the control reference 112 of FIG. 1 may be identical to the second memory location 154 of the memory 150 in FIG. 2. Alternatively, the second memory location 154 may be part of a non-volatile memory component while the control reference 112 may be part of a volatile memory component. On initiation of a control algorithm, the value stored in the second memory location 154 may be loaded into the control reference 112 before executing closed loop control of the air flow.

In an embodiment, the processor may be a microcontroller, a microprocessor, a digital signal processor (DSP), an application specific integrated circuit (ASIC), a field programmable gate array (FPGA), a complex programmable logic device (CPLD), or other processor. In an embodiment, the processor may provide the functionality and memory represented as the controller 110, the control reference 112, and the summation junction 116 in FIG. 1. For example, the processor may execute logic instructions to perform the functions of the controller 110 and the summation junction 116.

In an embodiment, a cyclic redundancy check value is calculated on the control reference value and stored in the third memory location 156 at the same time that the control reference value is stored in the second memory location 154. When the processor reads the control reference value from the second memory location 154 it may calculate a cyclic redundancy check value on the control reference value and compare with the cyclic redundancy check value that it reads from the third memory location 156. If the calculated cyclic redundancy check value does not agree with the cyclic redundancy check value stored in the third memory location 156, the processor may raise an alarm and/or power the system 100 off.

Figure 3:
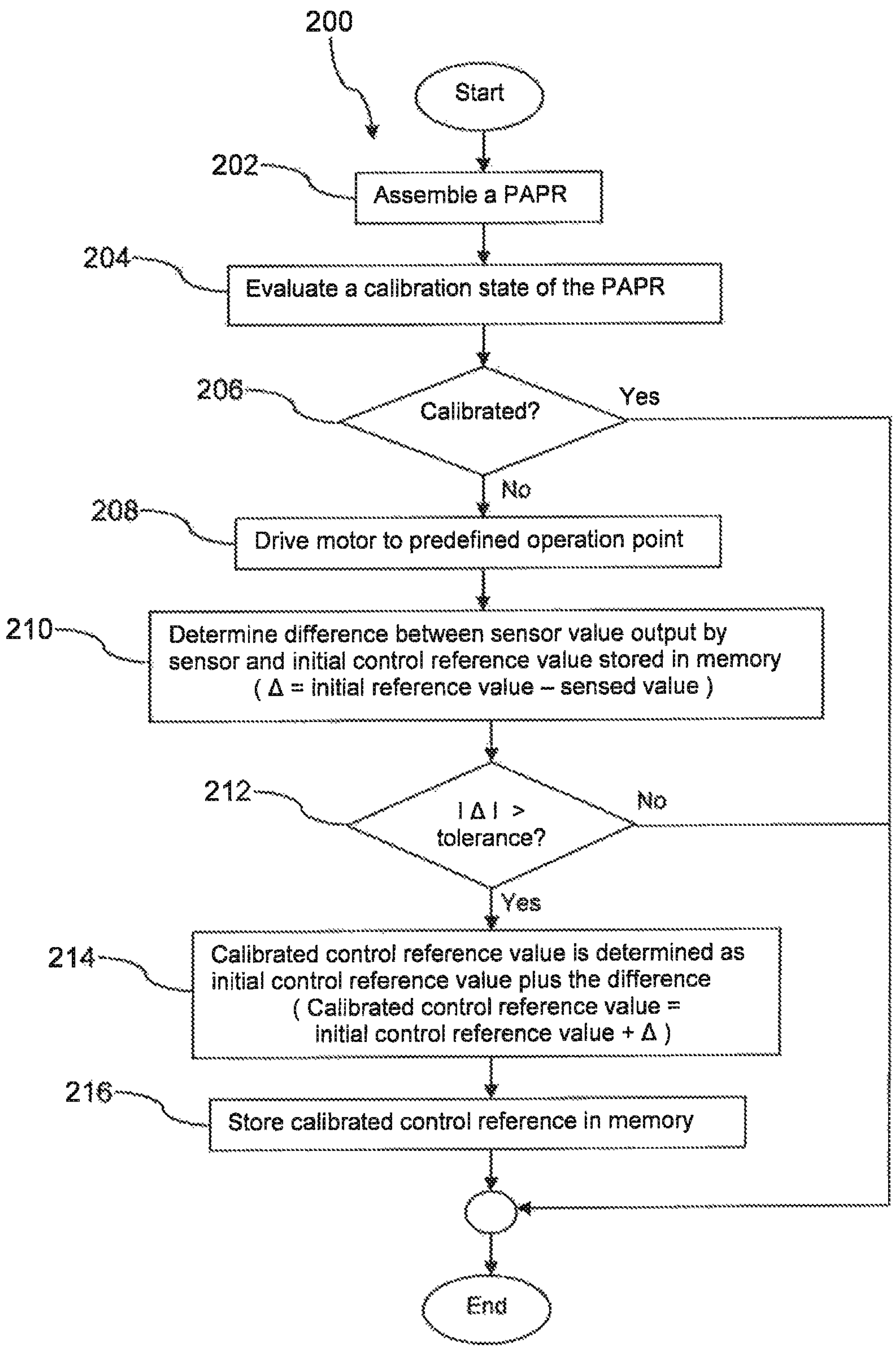
FIG. 3 is a flow chart of a method according to an embodiment of the disclosure.

Turning now to FIG. 3, a method 200 is described. At block 202, a PAPR is assembled. The PAPR may be assembled in a manufacturing plant. The PAPR may comprise an air blower, an electric motor coupled to the air blower, an air flow sensor and an electronic controller coupled to the electric motor and to the air flow sensor. In embodiment, the PAPR may be substantially the same as the system 100 described above with reference to FIG. 1. The air flow sensor may comprise a differential pressure sensor having a first probe located in an airflow channel of the PAPR that measures a stagnation pressure in the airflow channel and a second probe located to measure a static pressure in the airflow channel as described above. In another embodiment, however, the air flow sensor may be a different kind of sensor. The PAPR may comprise a filter that filters and/or smooths the output of the air flow sensor. In an embodiment, the PAPR may comprise the air blower 102, the electric motor 104, the battery 106, the switched mode power supply 108, the controller 110, the control reference 112, the sensor 114, and the summation junction 116 described above with reference to FIG. 1. In another embodiment, however, the PAPR may be somewhat different.

At block 204, a calibration state of the PAPR is evaluated. The processing of block 204 may happen during power-on of the PAPR. For example, a processor and/or the controller 110 of the PAPR reads the first memory location 152 of the memory 150. If the calibration state is calibrated 206, the PAPR is already calibrated and the method 200 ends. If the calibration state is uncalibrated 206, the processing proceeds to block 208. At block 208, the electric motor is driven to a predefined operation point. For example, the processor and/or controller 110 outputs a pulse width modulation command comprising a predefined voltage command and/or a predefined pulse width command to the switched mode power supply 108, and the switched mode power supply 108 outputs an electrical power signal to the electric motor 104, thereby driving the electric motor 104 to operate at a predefined operation point in an open-loop mode. The processing of block 208 may include a predetermined wait time that promotes allowing the electric motor 104 to reach steady state rotation.

At block 210, a difference between the sensor value output by the sensor and an initial control reference value is determined and stored in memory. For example, the summation junction 116 or the processor and/or the controller 110 subtracts the value output by the sensor 114 from the value stored in the second memory location 154 to determine a delta value $$\Delta = \text{initial control reference value} - \text{output of air flow sensor} \quad \text{Eq 1}$$

It is understood that in an embodiment a filtered value of the output of the air flow sensor 114 may be used in this calculation.

At block 212, if the absolute value of the delta value is not greater than a predefined tolerance value, the PAPR is deemed calibrated, and the method 200 ends. If the absolute value of the delta value is greater than the predefined tolerance value, the processing proceeds to block 214. At block 214, a calibrated control reference value is determined by adding the initial control reference value and the delta value.

$$\text{calibrated control reference value} = \text{initial control reference value} + \Delta \quad \text{Eq 2}$$

At block 216, the calibrated control reference value is stored in memory. For example, the calibrated control reference value is stored in the second memory location 154 and/or in the control reference 112. In an embodiment, after the processing of block 216, the first memory location 152 may be written with a calibrated state value. In an embodiment, a cyclic redundancy check value is calculated on the calibrated control reference value, and the cyclic redundancy check value is stored in the third memory location 156. The process then exits. The processing of blocks 204 through 216 in method 200 may be performed by a processor and/or the controller 110.

The effect of the processing of method 200 is that the PAPR automatically self-calibrates during a first power-on cycle. The initial control reference value may be stored in the control reference 112 and/or in the second memory location 154 during a loading of firmware and/or software to the PAPR, for example during loading of firmware and/or software to the processor and/or controller 110 during initial assembly of the PAPR. The automatic self-calibration taught herein reduces the chances that the step of calibration may be omitted before the PAPR is shipped and that the PAPR may be operated by users in an uncalibrated mode. Further, the automatic self-calibration does not entail any human involvement in the calibration procedure and hence removes a rich source of calibration errors.

Figure 4:
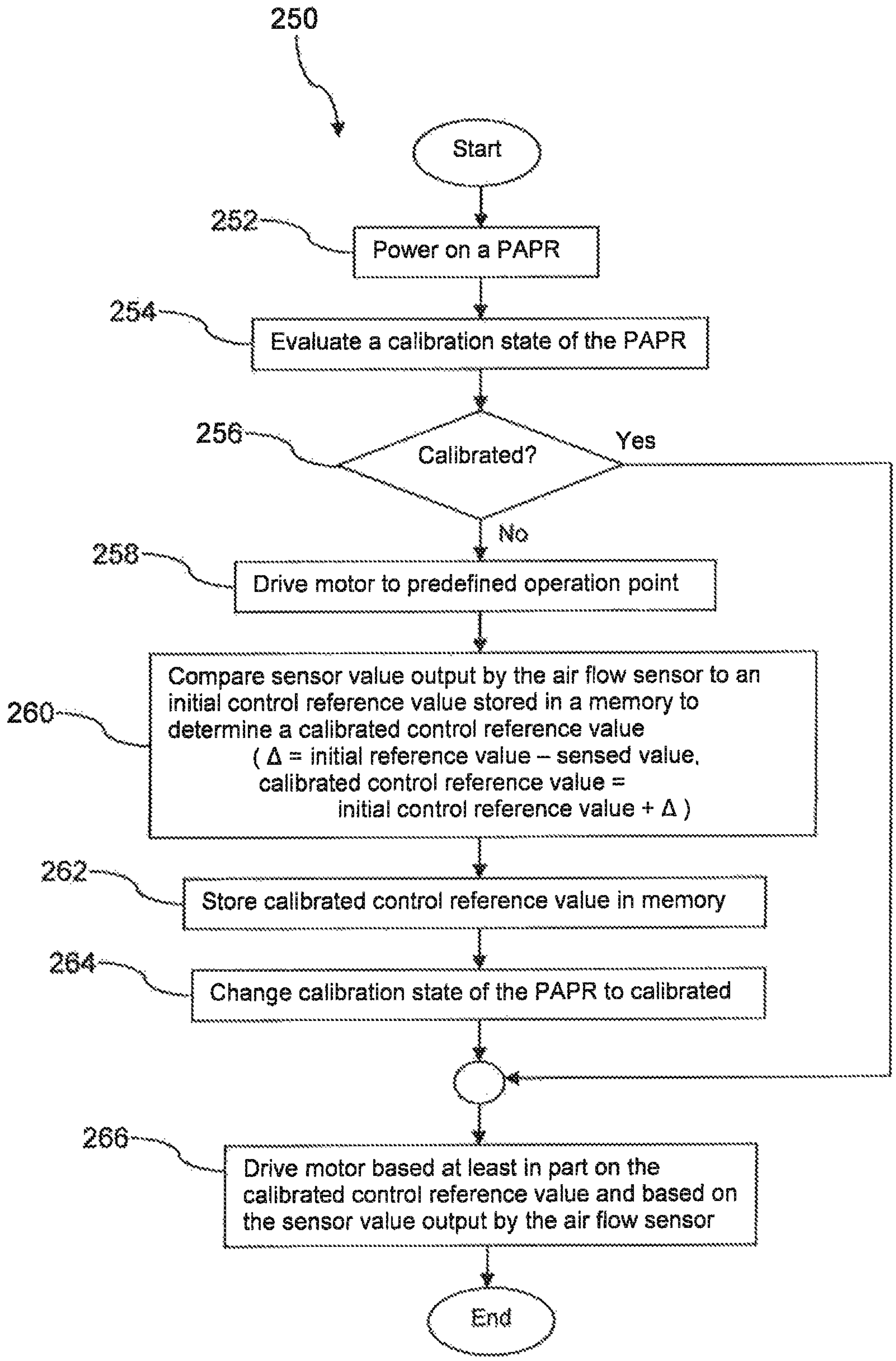
FIG. 4 is a flow chart of a method according to an embodiment of the disclosure.

Turning now to FIG. 4, a method 250 is described. The method 250 may be performed in the field, after shipment of the PAPR from the manufacturing plant and/or from a distribution center. For example, the method 250 may be performed in the field after coupling a battery to the PAPR. The PAPR may comprise the system 100 described above with reference to FIG. 1, but in another embodiment the PAPR may differ in some aspects from the system 100 described above. At block 252, the PAPR is powered on. At block 254, a calibration state of the PAPR is evaluated. For example, a processor and/or the controller 110 reads the first memory location 152 of the memory 150. If the calibration state of the PAPR is determined to be calibrated 256, the method 250 ends. If the calibration state of the PAPR is determined to be uncalibrated 256, the processing proceeds to block 258. At block 258 the electric motor is driven to a predefined operation point, substantially as described above with reference to block 208 in FIG. 3.

At block 260, the sensor value output by the air flow sensor is compared to an initial control reference value stored in a memory to determine a calibrated control reference value. For example, the calibrated control reference value equals the initial control reference value plus the initial control reference value minus the sensed value. At block 262, the calibrated control reference value is stored in memory, for example in the second memory location 154. In an embodiment, a cyclic redundancy check value is calculated on the calibrated control reference value At block 264 the calibration state of the PAPR is changed to calibrated. For example, the calibrated state value is stored in the first memory location 152. At block 266 the electric motor is driven based at least in part on the calibrated control reference value and based on the sensor value output by the air flow sensor. For example, the controller 110 drives the switched mode power supply 108 with command values that cause the switched mode power supply 108 to provide electrical power signals to the electric motor 104 based on the control reference 112 and/or the value read from the second memory location 154 and based on the output of the sensor 114. In embodiment, the controller 110 may determine the commands for the electric motor 104 based on a filtered output of the sensor 114. The processing of blocks 254 through 266 in method 250 may be performed by a processor and/or the controller 110.

Figure 5:
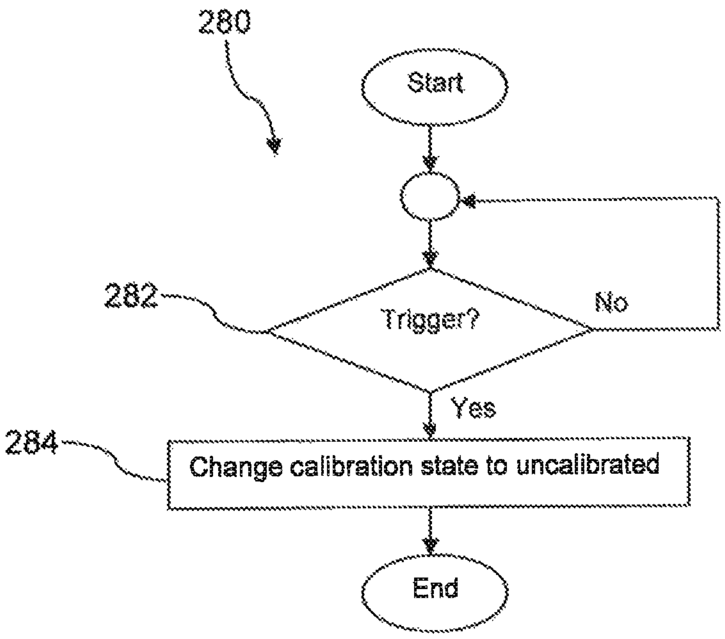
FIG. 5 is a flow chart of a method according to an embodiment of the disclosure.

Turning now to FIG. 5, a method 280 is described. At block 282 if a trigger signal is received by the PAPR, for example by the processor and/or the controller 110, the process proceeds to block 284. The trigger signal may be any input provided by a user, for example by pressing and holding a button located on an exterior housing of the PAPR for a predefined time duration or by activating another control device. At block 284, the calibration state of the PAPR is changed to the uncalibrated state. For example, the uncalibrated value is written to the first memory location 152. The effect of the processing of block 284 is that the next time the PAPR is powered on, being in the uncalibrated state, the automated self-calibration process may occur as described above. A user may occasionally activate the trigger in order that the PAPR may recalibrate, for example after a predefined service interval or after a predefined number of uses or just to confirm to the user's satisfaction that the PAPR is calibrated. If the trigger is not activated, the processing of method 280 continues to loop through block 282. In an embodiment, the processing of block 282 may occur during times when the processor and/or the controller 110 is idle or during low priority task execution scheduling. Alternatively, the processing of method 280 may be embedded in a control algorithm that continuously executes on the processor and/or on the controller 110.

Figure 6:
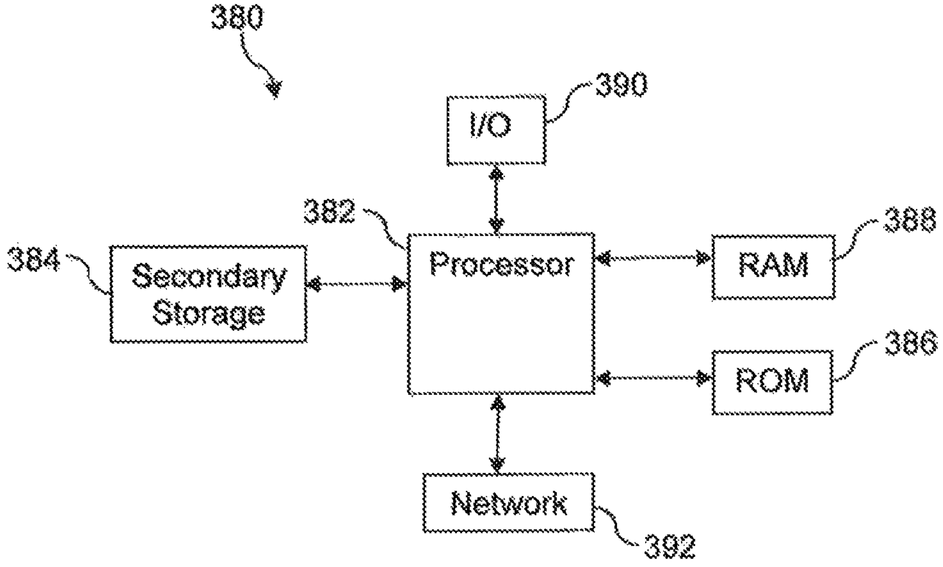
FIG. 6 is an illustration of an exemplary computer system suitable for implementing an embodiment of the disclosure.

FIG. 6 illustrates a computer system 380 suitable for implementing one or more embodiments disclosed herein, for example the controller 110 may share some of the structures of the computer system 380. In an embodiment, the controller 110 and/or the summation junction 116 may be implemented in firmware as an algorithm that is repeatedly executed on a processor 382 of the computer system 380. In an embodiment, the computer system 380 comprises the processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips. In some embodiments, the computer system 380 may not comprise all of the components enumerated above. For example, in an embodiment, the computer system 380 may not have secondary storage 384. Additionally, some of the components listed separately above may be combined in a single component, for example the processor 380, the ROM 386, and the RAM 388 may be integrated in a single component and/or single semiconductor chip.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

The memory 150 described above with reference to FIG. 2 may be part of the ROM 386 or the RAM 388. Likewise, the control reference 112 described above with reference to FIG. 1 may be stored in the RAM 388. In an embodiment, on power on of the PAPR, the processor 382 reads the calibrated control reference value from the second memory location 154, which may be stored in ROM 386, reads the cyclic redundancy check value stored in the third memory location 156, which may be stored in ROM 386, calculates a cyclic redundancy check value over the calibrated control reference value read from the second memory location 154, and compares the calculated cyclic redundancy check value to the stored cyclic redundancy check value. If the CRCs agree, the processor 382 may write the calibrated control reference value into the control reference 112 which may be stored in RAM 388. On subsequent normal mode processing, the controller 110 may control the electric motor 104 based on accessing the control reference 112 stored in RAM 388. If the CRCs do not agree, the processor may present an alarm and power off the PAPR.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modern banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system. 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A self-calibrating powered air purifying respirator (PAPR), comprising:

an electric motor mechanically coupled to a blower;

an air flow sensor; and a controller coupled to the air flow sensor and to the electric motor, wherein the controller is configured to automatically execute a one-time self-calibration by driving the electric motor to a predefined operation point, receiving an indication from the air flow sensor, determining a reference parameter based on the indication from the air flow sensor, and storing the reference parameter, wherein after completion of the one-time self-calibration the controller controls the electric motor based on the stored reference parameter;

wherein the air flow sensor comprises a first probe located in an airflow channel of the PAPR to measure a stagnation pressure in the air flow channel and a second probe located to measure a static pressure in the air flow channel, wherein the all flow sensor develops the indication of air flow that comprises a difference of pressure between the first and second probes; and wherein the reference parameter is based on determining a difference between an initial value of the reference parameter and the indication of air flow, and when the difference exceeds a tolerance value, adding the initial value and the difference.

2. The PAPR of claim 1, further comprising a battery coupled to the electric motor, wherein the PAPR is human portable.

3. The PAPR of claim 2, further comprising a switched mode power supply coupled to the battery, coupled to the electric motor, and coupled to the controller, wherein the electric motor is powered by the switched mode power supply, and wherein the switched mode power supply is controlled by the controller.

4. The PAPR of claim 1, wherein the predefined operation point of the electric motor is one of a predefined pulse width modulation voltage or a predefined pulse width modulation current level.

5. The PAPR of claim 1, wherein storing the reference parameter includes calculating a cyclic redundancy check (CRC) value of the reference parameter and writing the reference parameter value and the CRC value to a memory of the controller.

6. A self-calibrating powered air purifying respirator (PAPR), comprising:

an electric motor mechanically coupled to a blower;

an air flow sensor, wherein the air flow sensor comprises a first probe located in an air flow channel of the PAPR to measure a stagnation pressure in the airflow channel and a second probe located to measure a static pressure in the airflow channel, wherein the air flow sensor develops an indication of air flow that comprises a difference of pressure between the first and second probe;

a controller coupled to the air flow sensor and to the electric motor, wherein the controller is configured to automatically execute a one-time self-calibration by driving the electric motor to a predefined operation point, receiving the indication from the air flow sensor, determining a reference parameter based on the indication from the air flow sensor, and storing the reference parameter, wherein after completion of the one-time self-calibration the controller controls the electric motor based on the stored reference parameter;

a battery coupled to the electric motor, wherein the PAPR is human portable; and a switched mode power supply coupled to the battery, coupled to the electric motor, and coupled to the controller, wherein the electric motor is powered by the switched mode power supply, and wherein the switched mode power supply is controlled by the controller;

wherein the reference parameter is determined based on the difference between an initial value of the reference parameter and the indication of air flow and when the difference exceeds a tolerance value, the initial value and the difference are added.

7. The PAPR of claim 6, wherein the controller configuration for storing the reference parameter includes calculating a cyclic redundancy check (CRC) value of the reference parameter and writing the reference parameter value and the CRC value to a memory of the controller.

8. A self calibrating powered air purifying respirator (PAPR), comprising:

a blower;

an electric motor coupled to the blower;

an air flow sensor;

a controller coupled to the electric motor and to the air flow sensor;

wherein evaluation of a calibration state of the powered air purifying respirator is performed automatically by the controller which drives the electric motor to a predefined operation point when the PAPR is in an uncalibrated state;

wherein the controller compares a sensor value output to an initial control reference value stored in a memory of the controller to determine a calibrated control reference value which is stored in the memory of the controller; and wherein the controller is configured to control the electric motor based at least in part on the calibrated control reference value stored in the memory when the powered air purifying respirator is in a calibrated state;

wherein the air flow sensor determines the calibrated control reference value by subtracting the sensor value output from the initial control reference value and adding the difference to the initial value of the control reference.

9. The PAPR of claim 8, wherein the controller evaluates the calibration state of the powered air purifying respirator by reading the calibration state stored in the memory, and by writing the calibration state to the memory after storing the calibrated control reference value in the memory.

10. The PAPR of claim 8, wherein the controller drives the electric motor to the predefined operation point with a predefined pulse width modulated signal.

11. The PAPR of claim 10, wherein the controller drives the electric motor to the predefined operation point by waiting a predefined period of time for the electric motor to reach the predefined operation point.

12. The PAPR of claim 8, wherein the air flow sensor calculates a first cyclic redundancy check (CRC) value on the initial control reference value and compares the first cyclic redundancy check value to a cyclic redundancy check value stored in the memory before the air flow sensor compares the sensor value output to the initial control reference value.

13. The PAPR of claim 8, wherein the air flow sensor calculates a second cyclic redundancy check value on the calibrated control reference value and stores the second cyclic redundancy check value in the memory.

* * * * *